(12) United States Patent
Kumano et al.

(10) Patent No.: US 11,810,369 B2
(45) Date of Patent: Nov. 7, 2023

(54) SELF-POSITION ESTIMATION DEVICE

(71) Applicants: SOKEN, INC., Nisshin (JP); DENSO CORPORATION, Kariya (JP)

(72) Inventors: Shunya Kumano, Nisshin (JP); Takeshi Shikimachi, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 527 days.

(21) Appl. No.: 17/105,303

(22) Filed: Nov. 25, 2020

(65) Prior Publication Data

US 2021/0081682 A1    Mar. 18, 2021

Related U.S. Application Data

(63) Continuation of application No. PCT/JP2019/001603, filed on Jan. 21, 2019.

(30) Foreign Application Priority Data

May 30, 2018    (JP) ................. 2018-103519

(51) Int. Cl.
  *G06V 20/56*    (2022.01)
  *B60W 30/12*    (2020.01)
  *G01C 21/36*    (2006.01)
  *G01S 19/42*    (2010.01)

(52) U.S. Cl.
  CPC .......... *G06V 20/588* (2022.01); *B60W 30/12* (2013.01); *G01C 21/3658* (2013.01); *G01S 19/42* (2013.01); *B60W 2420/42* (2013.01); *B60W 2552/30* (2020.02); *G06T 2207/30256* (2013.01)

(58) Field of Classification Search
  CPC ............ B60W 30/12; B60W 2420/42; B60W 2552/30; G01C 21/3658; G01S 19/42; G06V 20/588; G06T 2207/30256
  See application file for complete search history.

(56) References Cited

U.S. PATENT DOCUMENTS

| | | | |
|---|---|---|---|
| 2010/0023245 A1* | 1/2010 | Huang | B60W 30/12 701/300 |
| 2010/0246889 A1 | 9/2010 | Nara et al. | |
| 2010/0299063 A1 | 11/2010 | Nakamura et al. | |

(Continued)

FOREIGN PATENT DOCUMENTS

| | | |
|---|---|---|
| JP | 2007-192582 A | 8/2007 |
| JP | 2015-102449 A | 6/2015 |

*Primary Examiner* — Katrina R Fujita
(74) *Attorney, Agent, or Firm* — MASCHOFF BRENNAN (57) ABSTRACT

A self-position estimation device equipped to a vehicle: captures an image of a periphery of the vehicle; detects a state quantity of the vehicle; acquires position information indicating a position of the vehicle from a satellite system; stores map data that defines a map in which a road is expressed by a link and a node; estimate a self-position of the vehicle on the map, as an estimation position, based on the captured image, the state quantity, the position information, and the map data, respectively; recognizes a road section in which a lane quantity increases or decreases based on the captured image; and sets a weighting of the estimation position of the vehicle estimated based on the map data relatively smaller in response to a recognition of the road section in which the lane quantity increases or decreases.

17 Claims, 9 Drawing Sheets

(56) References Cited

U.S. PATENT DOCUMENTS

2013/0151135 A1* 6/2013 Aubrey ................ G08G 1/0116
                                                         701/117
2016/0314358 A1   10/2016 Kushida et al.
2018/0365998 A1* 12/2018 Shibata ............ G08G 1/096791

* cited by examiner

SELF-POSITION ESTIMATION DEVICE

CROSS REFERENCE TO RELATED APPLICATIONS

The present application is a continuation application of International Patent Application No. PCT/JP2019/001603 filed on Jan. 21, 2019, which designated the U.S. and claims the benefit of priority from Japanese Patent Application No. 2018-103519 filed on May 30, 2018. The entire disclosures of all of the above applications are incorporated herein by reference.

TECHNICAL FIELD

The present disclosure relates to a self-position estimation device that estimates a self-position of a vehicle on a map.

BACKGROUND

There has been known a position estimation device that estimates a curvature radius of the road based on map data.

SUMMARY

A self-position estimation device equipped to a vehicle: captures an image of a periphery of the vehicle; detects a state quantity of the vehicle; acquires position information indicating a position of the vehicle from a satellite system; stores map data that defines a map in which a road is expressed by a link and a node; estimates a self-position of the vehicle on the map, as an estimation position, based on the captured image, the state quantity, the position information, and the map data, respectively; recognizes a road section in which a lane quantity increases or decreases based on the captured image; and sets a weighting of the estimation position of the vehicle estimated based on the map data in response to a recognition of the road section in which the lane quantity increases or decreases.

BRIEF DESCRIPTION OF DRAWINGS

Objects, features and advantages of the present disclosure will become apparent from the following detailed description made with reference to the accompanying drawings. In the drawings.

DETAILED DESCRIPTION

There has been known a self-position estimation device. The self-position estimation device (also known as a traveling lane estimation device) estimates the curvature radius of the road based on map data using a map link while the vehicle is traveling a curved section of the road. The curvature radius of the traveling locus is also estimated based on the actual travelling speed of the vehicle and the actual changing rate of the traveling direction (also known as yaw rate). Then, according to the difference between the curvature radius of the actual travelling road and the curvature radius of the travelling locus, the estimation devices determines the lane (the lane number, such as 1st lane or 2nd lane) in which the vehicle is currently traveling.

In general, in a road section where the number of lanes changes, that is a quantity of lanes changes, road link data is not prepared accurately enough, and there is a risk of erroneous estimation of self-position and identification of lane number.

According to an aspect of the present disclosure, a self-position estimation device equipped to a vehicle includes: a vehicle-mounted camera capturing an image of a periphery of the vehicle; a vehicle state quantity sensor detecting a state quantity of the vehicle; a satellite positioning acquisition unit acquiring latitude and longitude of a position of the vehicle from a satellite system; a map data storage storing map data that defines a map in which a road is expressed by a link and a node; and a position estimation unit estimating a self-position of the vehicle on the map, as an estimation position, based on the image captured by the vehicle-mounted camera, the state quantity, the latitude and longitude, and the map data, respectively.

The position estimation unit includes: a lane quantity change determiner recognizing a road section in which a lane quantity increases or decreases based on an image sensing of the vehicle-mounted camera; and a position corrector setting a weighting of the estimation position of the vehicle estimated based on the map data relatively smaller in response to a recognition of the road section in which the lane quantity increases or decreases compared with a case where the road section in which the lane quantity increases or decreases is not recognized.

According to another aspect of the present disclosure, a self-position estimation device equipped to a vehicle includes: a vehicle-mounted camera capturing an image of a periphery of the vehicle; a vehicle state quantity sensor detecting a state quantity of the vehicle; a satellite positioning acquisition unit acquiring latitude and longitude of a position of the vehicle from a satellite system; a map data storage storing map data that defines a map in which a road is expressed by a link and a node; and a position estimation unit estimating a self-position of the vehicle on the map, as an estimation position, based on the image captured by the vehicle-mounted camera, the state quantity, the latitude and longitude, and the map data, respectively.

The position estimation unit includes: a lane quantity change determiner recognizing a road section in which a lane quantity increases or decreases based on an image sensing of the vehicle-mounted camera; and a position corrector correcting the estimation position of the vehicle estimated by the estimation position unit based on the map data by setting a weighting of the estimation position of the vehicle estimated based on the map data smaller in response to a recognition of the road section in which the lane quantity increases or decreases compared with a case where the road section in which the lane quantity increases or decreases is not recognized.

According to another aspect of the present disclosure, a self-position estimation device equipped to a vehicle includes: a vehicle-mounted camera capturing an image of a periphery of the vehicle; a vehicle state quantity sensor detecting a state quantity of the vehicle, the state quantity of the vehicle including a vehicle speed; a receiver receiving position information indicating a position of the vehicle from a satellite system; a map data storage storing map data that defines a map in which a road is expressed by a link and a node; and a processor executing a program stored in a non-transitory computer readable medium. The processor is configured to: estimate a self-position of the vehicle on the map, as an estimation position, based on the image captured by the vehicle-mounted camera, the state quantity of the vehicle, the position information of the vehicle from the satellite system, and the map data, respectively; recognize a road section in which a lane quantity increases or decreases based on the image captured by the vehicle-mounted camera; and correct the estimation position of the vehicle estimated based on the map data by setting a weighting of the estimation position of the vehicle estimated based on the map data relatively smaller in response to a recognition of the road section in which the lane quantity increases or decreases compared with a case where the road section in which the lane quantity increases or decreases is not recognized.

In the present disclosure, a self-position estimation device equipped to a vehicle includes: a vehicle-mounted camera capturing an image of a periphery of the vehicle; a vehicle state quantity sensor detecting a state quantity of the vehicle; a satellite positioning acquisition unit acquiring latitude and longitude of a position of the vehicle from a satellite system; a map data storage storing map data that defines a map in which a road is expressed by a link and a node; and a position estimation unit estimating a self-position of the vehicle on the map, as an estimation position, based on the image captured by the vehicle-mounted camera, the state quantity, the latitude and longitude, and the map data, respectively.

The position estimation unit includes: a lane quantity change determiner recognizing a road section in which a lane quantity increases or decreases based on an image sensing of the vehicle-mounted camera; and a position corrector correcting the estimation position of the vehicle estimated by the estimation position unit based on the map data by decreasing a weighting of the estimation position of the vehicle estimated based on the map data in response to a recognition of the road section in which the lane quantity increases or decreases compared with a case where the road section in which the lane quantity increases or decreases is not recognized.

In general, in map data representing a road using links and nodes, the link is often not clearly set in a section where the quantity of lanes of the road increases or decreases. In the present disclosure, in response to recognition of the road section where the quantity of lanes increases or decrease, the position corrector corrects the estimation position by setting the weighting of estimation position, which is estimated based on the map data by the position estimation unit, to be smaller than the weighting of estimation position where the quantity of lanes does not change. Therefore, it is possible to suppress a decrease in the estimation accuracy of the self-position in the road section where the quantity of lanes is increased or decreased. In the present disclosure, in response to recognition of the road section where the quantity of lanes increases or decrease, the position corrector sets the weighting of estimation position, which is estimated based on the map data by the position estimation unit, to be relatively smaller than the weighting of estimation position estimated based on the map in a case where the road section where the quantity of lanes increases or decreases is not recognized. Usually, in the road section where the quantity of lanes increases or decreases, the links and nodes of map data are not clearly set. Thus, the position estimated based on such map data may be incorrect. In the present disclosure, in response to the recognition of the road section where the quantity of lanes increases or decreases, the weighting of the estimation position based on the map data is set relatively smaller and the weightings of the estimation position based on the images, state quantity, and latitude and longitude are set relatively greater. Therefore, it is possible to suppress a decrease in the estimation accuracy of the self-position in the road section where the quantity of lanes is increased or decreased. With this configuration, it is possible to stabilize the estimation accuracy of self-position of the vehicle.

The following will describe embodiments for carrying out the present disclosure with reference to the drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

The following will describe a self-position estimation device 100 according to a first embodiment of the present disclosure with reference to FIG. 1 to FIG. 9. For example, the self-position estimation device 100 is equipped to a vehicle which has a navigation system or equipped to a vehicle which has an autonomous driving function. The self-position estimation device 100 estimates the position of the vehicle on the map, that is, the traveling lane of the road based on various data described below during a travelling of the vehicle 10. By estimating the self-position of the vehicle 10, it is possible to support the driver for safety driving and autonomous driving. For example, the vehicle 10 is an automobile.

Figure 1:
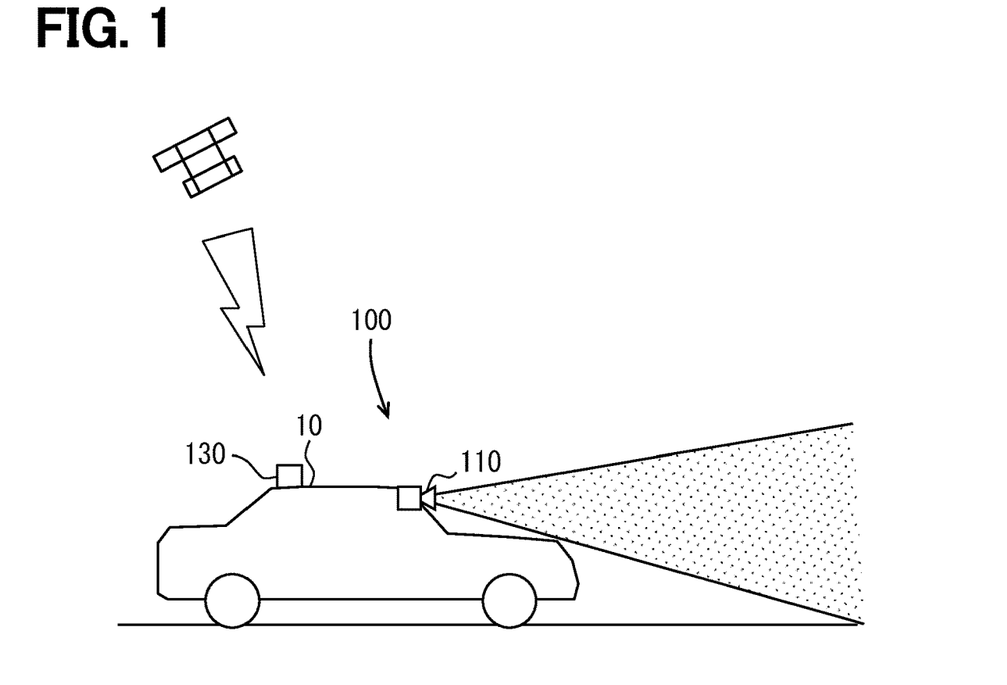
FIG. 1 is a diagram showing a side view of a vehicle.
Figure 2:
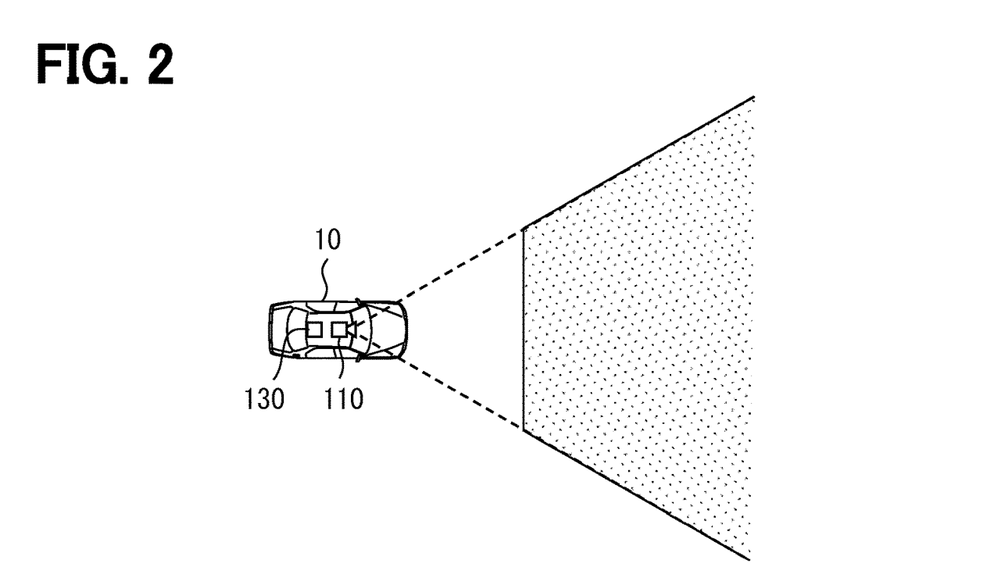
FIG. 2 is a diagram showing a plan view of a vehicle.
Figure 3:
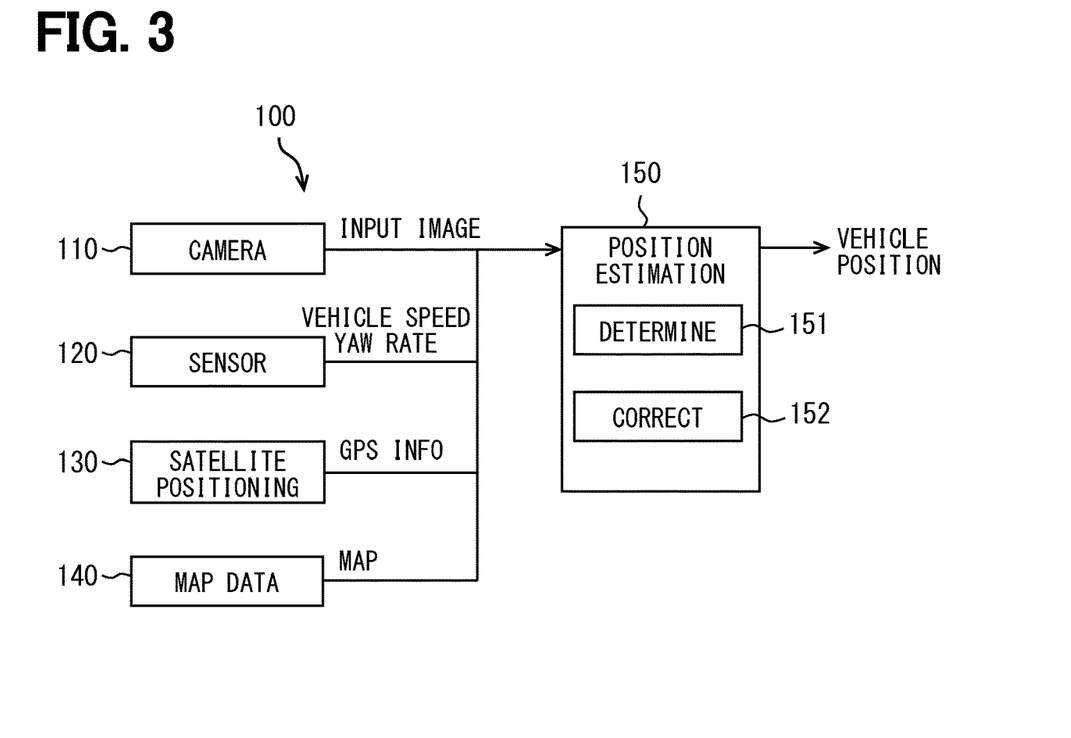
FIG. 3 is a block diagram showing a configuration of a self-position estimation device.

As shown in FIG. 1 to FIG. 3, the self-position estimation device 100 includes a vehicle-mounted camera 110, a vehicle state quantity sensor 120, a satellite positioning acquisition unit 130, a map data storage 140, and a position estimation unit 150.

For example, the vehicle-mounted camera 110 is attached to a front portion of the roof of the vehicle 10, and senses, that is, captures an image of the vehicle's periphery (for example, the front area) of the vehicle 10. The vehicle-mounted camera 110 outputs the obtained image data to the position estimation unit 150. For example, the captured image of vehicle periphery may be an image including a marking line on the road. The position estimation unit 150 is able to estimate, based on the captured image, characteristics of the road including a road width, a lane width, the quantity of lanes, and a road shape (straight road or curved road). The position estimation unit 150 is also able to estimate, based on the captured image, the position of the vehicle 10 on the road. Further, a lateral deviation and a turning angle with respect to the marking line on the road where the vehicle 10 is traveling may be estimated based on the image data obtained by the vehicle-mounted camera 110. A periphery of the vehicle 10 may be an entire range that can be captured by the vehicle-mounted camera 110 or a partial range captured by the vehicle-mounted camera 110. The periphery of the vehicle may also be a predetermined periphery range of the vehicle 10.

The vehicle state quantity sensor 120 detects a state quantity, for example, a traveling speed or a yaw rate of the vehicle 10 during the traveling. As the vehicle state quantity sensor 120, a speed sensor or a gyro sensor may be used. The vehicle state quantity sensor 120 outputs data related to the detected state quantity to the position estimation unit 150. Based on the state quantity data detected by the vehicle state quantity sensor 120, the position estimation unit 150 determines whether the vehicle 10 is traveling on a straight road, estimates a curvature of the road on which the vehicle 10 is travelling, or determines whether the vehicle travels out of the currently travelling lane.

For example, the satellite positioning acquisition unit 130 may be provided a receiver of a satellite positioning system, such as Global Positioning System (GPS), and receives signals from several satellites in the space. The satellite positioning acquisition unit 130 outputs the acquired GPS data to the position estimation unit 150. Based on the GPS data transmitted from the satellite positioning acquisition unit 130, the position estimation unit 150 estimates a current position (latitude and longitude) of the vehicle 10. The latitude and longitude are also referred to as position information. The satellite positioning acquisition unit 130 is also referred to as a satellite positioning receiver.

Figure 4:
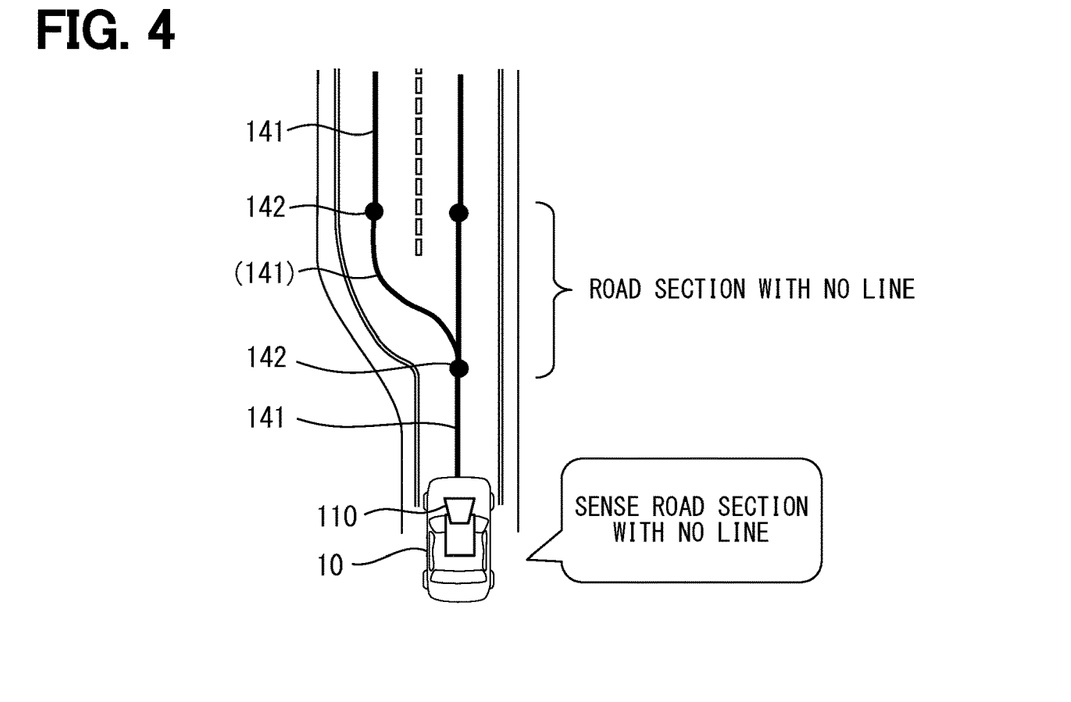
FIG. 4 is a diagram showing a sensing of a road section with no line by a vehicle-mounted camera.

The map data storage 140 stores the map data. As shown in FIG. 4, the map data defines a map on which a road is expressed by a link 141 and nodes 142. Specifically, in the map data, a link 141 which is a segment having a predetermined length is sequentially connected to another link via a node 142 along a road. On a road, a section in which the quantity of lanes increases or decreases (a section in which a marking line of the road is not clearly displayed) is referred to as a road section with no line. The link 141 in the road section with no line may be provided by a link 141 formed corresponding to a road shape, a link 141 having a straight shape, or a representative straight link 141 with no consideration of the quantity of lanes. Thus, the link 141 in the road section with no line has low accuracy as map data. The map data storage 140 outputs the map data to the position estimation unit 150.

For example, the map data storage 140 may be provided by a cloud server instead of a storage included in the self-position estimation device 100. The cloud server may be configured to transmit the map data to the position estimation unit 150 of the self-position estimation device 100 in order to provide the function of map data storage 140.

The position estimation unit 150 estimates the position of the vehicle 10 on the map based on the image data, the state quantity data, GPS data (latitude and longitude data), and the map data. The position estimation unit 150 includes, as an additional functional block, a lane quantity change determiner 151 and a position corrector 152. The position estimation unit 150 may be configured by a microcomputer which includes a processor, a memory, I/O and a bus connecting these elements. Some or all of the functions executed by the position estimation unit 150 may be configured in hardware manner by one or more integrated circuits or the like. Some or all of the functions executed by the position estimation unit 150 may also be configured in a combination of hardware manner and software manner. In the software manner, a processor may be used to execute some or all of the functions of the position estimation unit 150 by running a program stored in a non-transitory computer readable medium.

The lane quantity change determiner 151 recognizes a road section in which the quantity of lanes changes based on the image data obtained by the vehicle-mounted camera 110. Usually, since the road section in which the quantity of lanes changes has no marking lines for separating the lanes, the road section is also referred to as road section with no line.

In response to the lane quantity change determiner 151 recognizing the road section in which the quantity of lanes changes, the position corrector 152 sets the weighting of the position of the vehicle 10 estimated based on the map data to be lower than a case where the road section in which the quantity of lanes changes is not recognized. In this way, the position corrector 152 corrects the position of the vehicle 10 estimated based on the map data.

The following will describe an operation of the self-position estimation device 100 with further reference to FIG. 4 to FIG. 9.

Figure 5:
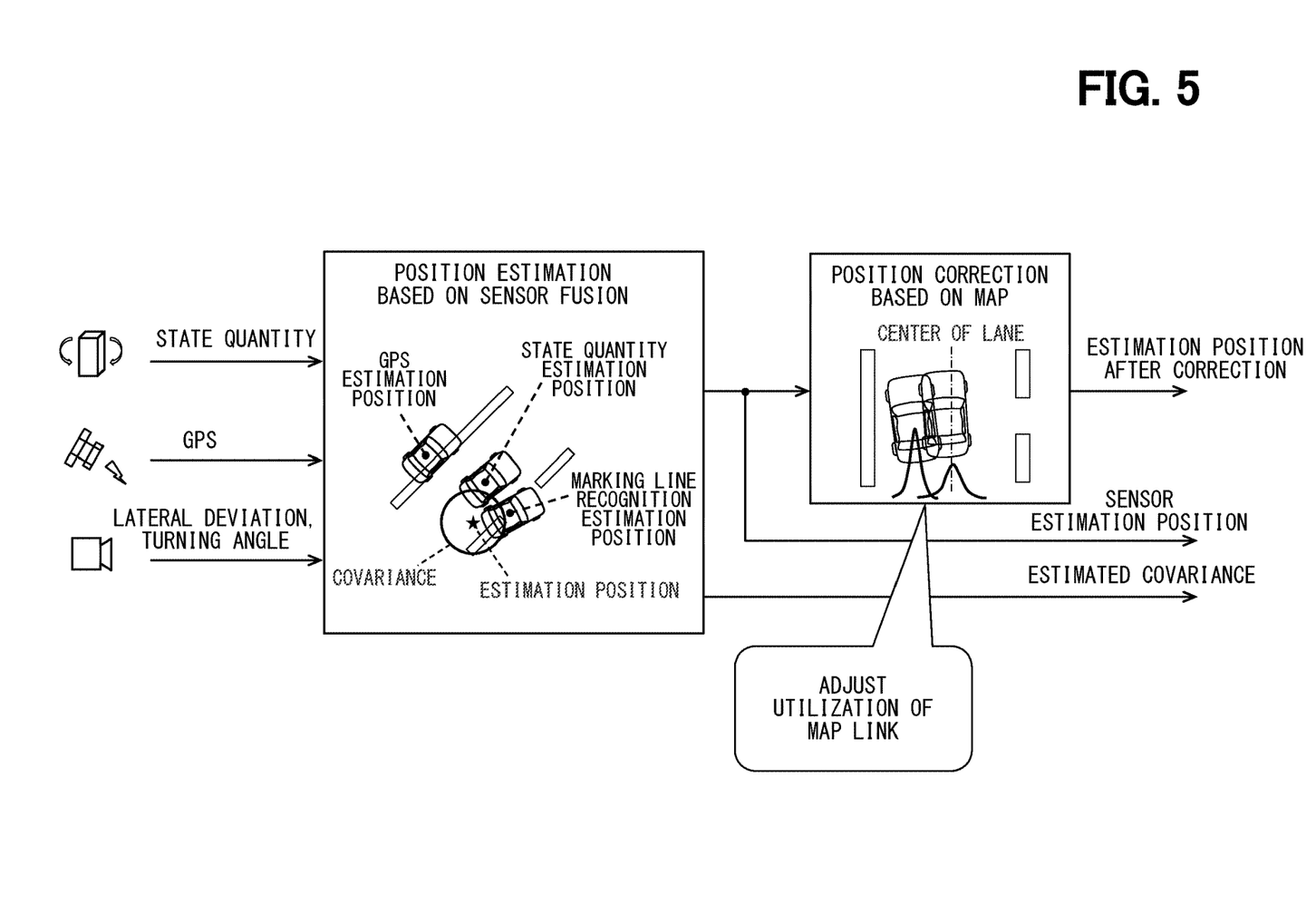
FIG. 5 is a diagram showing an adjustment (restriction) of utilization of link in map data during a traveling on the road section with no line.

As shown in FIG. 5, the position estimation unit 150 basically calculates the estimation position of the vehicle on the map data according to the marking line of the road which is recognized based on the image data obtained by the vehicle-mounted camera 110. The position of the vehicle calculated based on the recognized marking line is also referred to as a marking line recognition estimation position. The position estimation unit 150 calculates the estimation position of the vehicle on the map data according to the state quantity data output from the vehicle state quantity sensor 120. The position of the vehicle calculated based on the state quantity data is also referred to as a state quantity estimation position. The position estimation unit 150 calculates the estimation position of the vehicle on the map data based on GPS data transmitted from the satellite positioning acquisition unit 130. The position of the vehicle calculated based on the GPS data is also referred to as a GPS estimation position. The position estimation unit 150 calculates a covariance of the marking line recognition estimation position, the state quantity estimation position, and the GPS estimation position, and estimates the position of the vehicle 10. That is, the position estimation unit 150 specifies the road and the lane on which the vehicle 10 is positioned.

As shown in FIG. 4, in the present disclosure, in response to the lane quantity change determiner 151 recognizing the road section with no line based on the image data captured by the vehicle-mounted camera 110, the utilization of the map data (link 141) is restricted, that is, the weighting of the estimation position calculated based on the map data is decreased as shown in FIG. 5. In this way, the estimation position of the vehicle is corrected. In the road section with no line, the reliability of map data is intentionally decreased in the correction of the estimation position of the vehicle 10. That is, during a traveling on the road section with no line, the utilization of map link is restricted.

Figure 6:
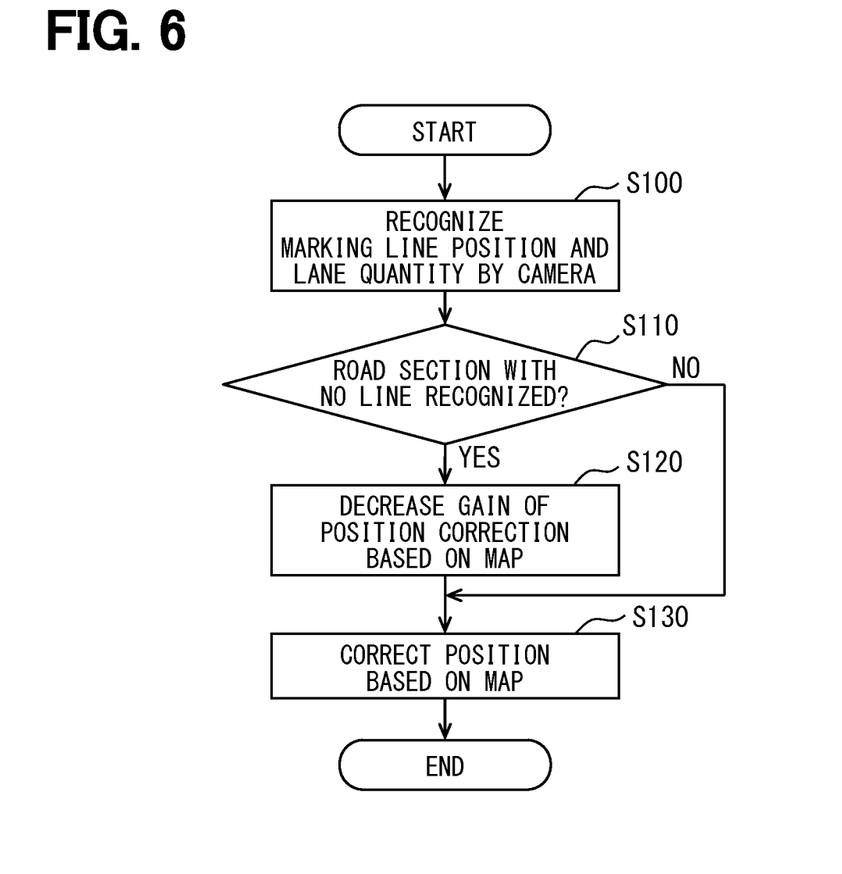
FIG. 6 is a flowchart showing a control for correcting a self-position in response to recognition of road section with no line.
Figure 7:
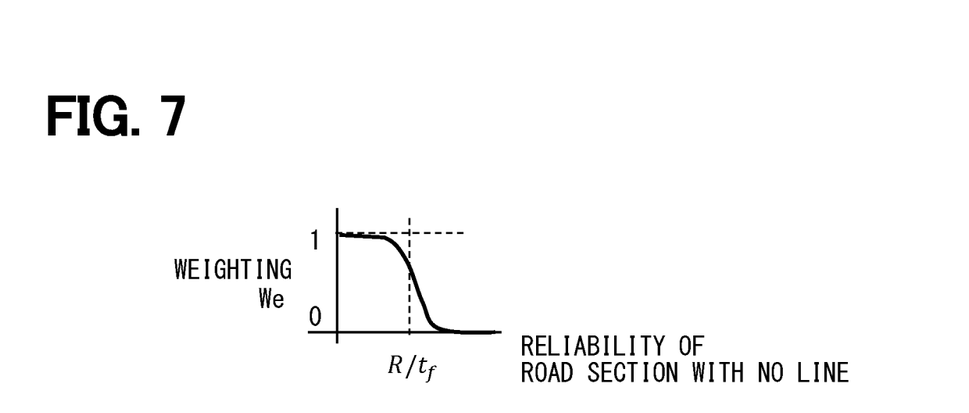
FIG. 7 is a diagram showing a weighting on a recognition reliability of a road section with no line.

Hereinafter, detailed procedure will be described with reference to FIG. 6 and FIG. 7. FIG. 6 is a flowchart showing a control for correcting a self position in response to recognition of road section with no line.

In S100, the lane quantity change determiner 151 recognizes the position of the marking line and the quantity of lanes based on the image data output from the vehicle-mounted camera 110. In S110, the lane quantity change determiner 151 determines whether a road section with no line exists. The process executed in S110 will be specifically described with reference to a sub flowchart in FIG. 8.

In response to the lane quantity change determiner 151 determining a road section with no line exists in S110, a gain (weighting) of the position estimation based on the map data (position correction) is decreased in S120. The weighting of the position estimation based on the map data is set to be decreased with an increase of the determination reliability of the existence of the road section with no line. For example, the weighting We of the position estimation based on map data may be set in relation to the determination reliability of the existence of the road section with no line with use of sigmoid function as shown in FIG. 7. Herein, if is predetermined conformance constant. A specific value of the weighting We may be set within a range of 0 to 1.

In S130, the estimation position based on the map data is corrected. In response to NO determination in S110, S130 is executed without executing S120.

Figure 8:
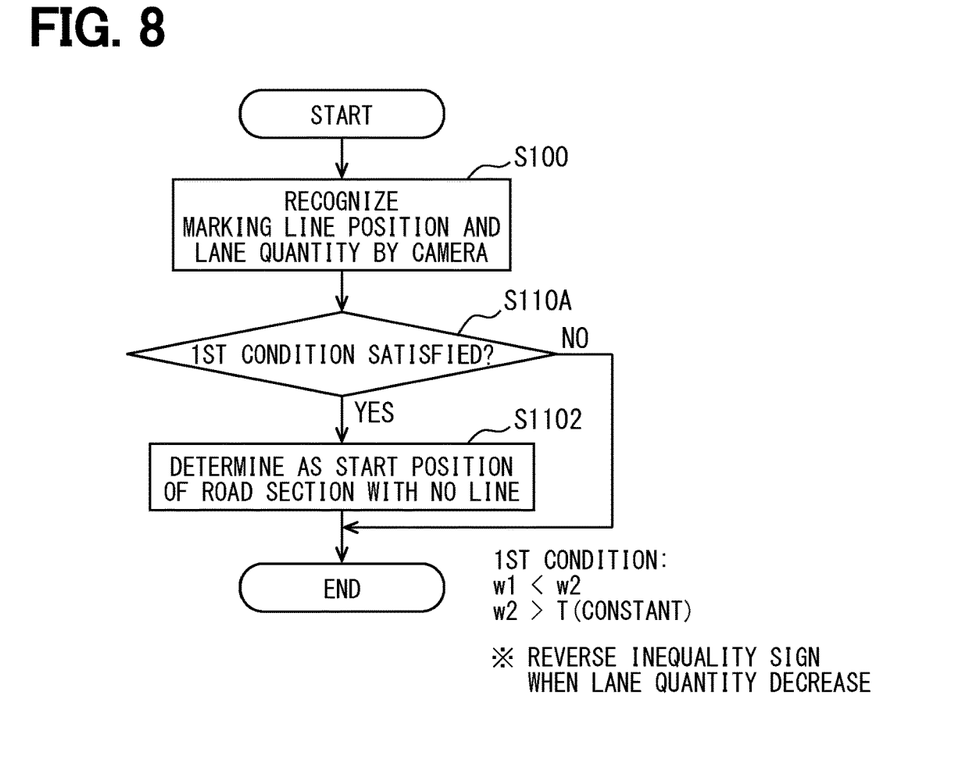
FIG. 8 is a flowchart showing a recognition of a road section with no line according to a first embodiment.
Figure 9:
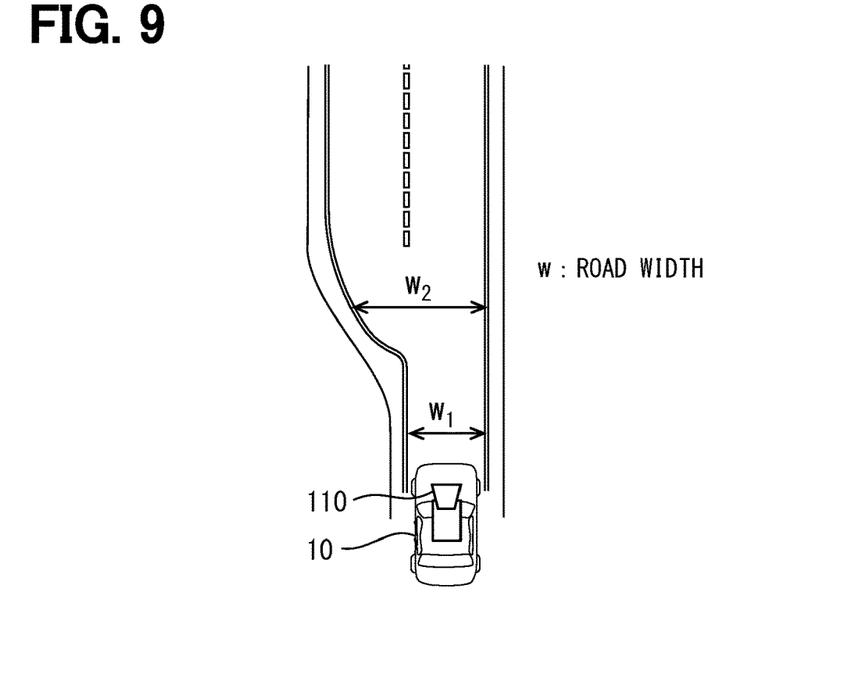
FIG. 9 is a diagram showing a determination condition in FIG. 8.

As shown in FIG. 8, after S100, the lane quantity change determiner 151 determines whether a first condition is satisfied in S110A. The first condition is about a recognition of a start position of the road section with no line (the road section in which the quantity of lanes changes) based on a changing amount of a road width (W1, W2 shown in FIG. 9) that is obtained by a recognition of the marking line on the road by the vehicle-mounted camera 110. Specifically, for the road in which the quantity of lanes increases, the first condition is satisfied in a case where a first road width W1<a second road width W2 and the second road width W2>a predetermined conformance constant T. Herein, the first road width W1 close to the vehicle than the second road width W2 and the second road width W2 are the road widths in the traveling direction of the vehicle in a case where the quantity of lanes increases. For the road in which the quantity of lanes decreases, the first condition is satisfied in a case where the first road width W1>the second road width W2 and the second road width W2<the predetermined conformance constant T. Herein, the first road width W1 is close to the vehicle than the second road width W2 in the traveling direction of the vehicle in a case where the quantity of lanes decreases.

In response to YES determination in S110A, the lane quantity change determiner 151 determines, in S1102, that the present position of the vehicle is the start position of the road section with no line. In response to NO determination in S110A, the lane quantity change determiner 151 determines that the road section with no line does not exist, and ends the process.

In general, in map data representing a road using links 141 and nodes 142, the link 141 is often not clearly set in a section where the quantity of lanes of the road increases or decreases. In the present embodiment, in response to recognition of the road section where the quantity of lanes increases or decrease by the lane quantity change determiner 151, the position corrector 152 corrects the estimation position by setting the weighting of estimation position to be smaller than the weighting of estimation position where the quantity of lanes does not change. Herein the estimation position is estimated based on the map data by the position estimation unit 150. Therefore, it is possible to suppress a decrease in the estimation accuracy of the vehicle position in the road section where the quantity of lanes is increased or decreased. In the present embodiment, in response to the recognition of the road section where the quantity of lanes increases or decreases, the weighting of the estimation position based on the map data is set relatively smaller and the weightings of the estimation position based on the captured images, state quantity, and latitude and longitude are set relatively greater. Thus, it is possible to suppress a decrease in the estimation accuracy of the vehicle position in the road section where the quantity of lanes increases or decreases. With this configuration, it is possible to stabilize the estimation accuracy of the self-position of the vehicle.

The position estimation unit 150 or the position corrector 152 may be configured to store the weighting of the estimation position based on map data, the weighting of estimation position based on the image data, the weighting of estimation position based on the state quantity, and the weighting of estimation position based on the GPS data.

At least one of the marking line recognition estimation position, the state quantity estimation position, or the GPS estimation position may be used to estimate the position of the vehicle 10. The position estimation unit 150 may omit the calculation of covariance in a case where only one estimation position, that is, the marking line recognition estimation position, the state quantity estimation position, or the GPS estimation position is calculated.

The estimation position based on the map data is a position of the vehicle estimated based on the map data. Specifically, the map data may be link information, node information, or a combination of the link information and the node information. The GPS estimation position is a current position (latitude and longitude) of the vehicle estimated based on GPS data. The state quantity estimation position is a position of the vehicle estimated based on the state quantity (vehicle speed, yaw rate, etc.) which is detected by the vehicle state quantity sensor 120. The marking line recognition estimation position is a position of the vehicle estimated based on the image data.

Second Embodiment

Figure 10:
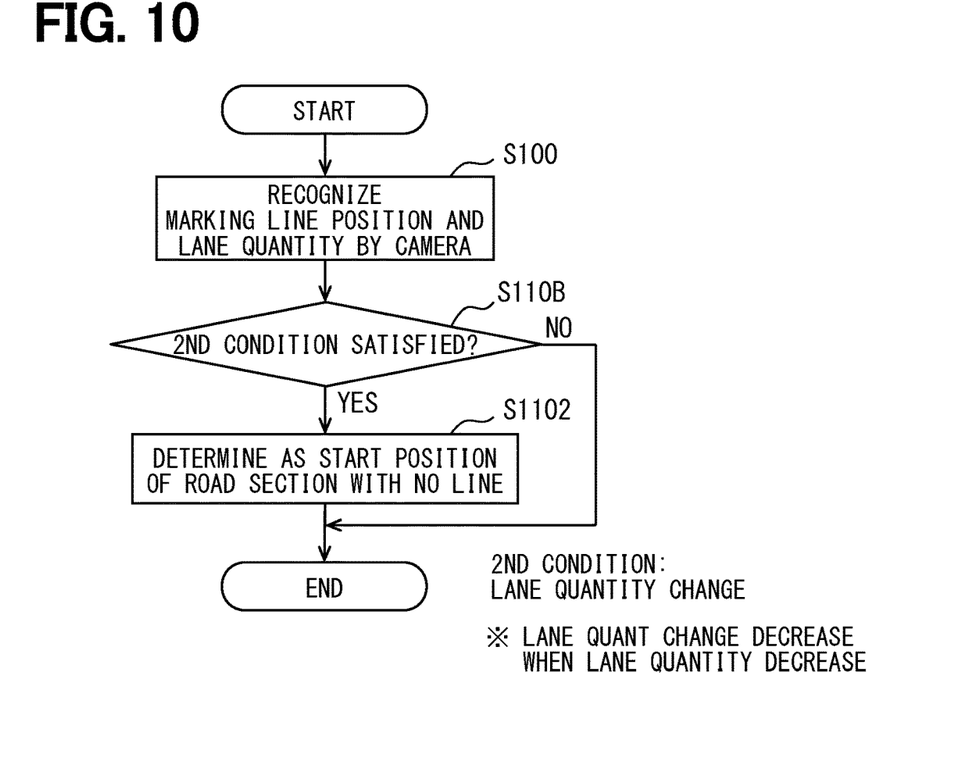
FIG. 10 is a flowchart showing a recognition of a road section with no line according to a second embodiment.
Figure 11:
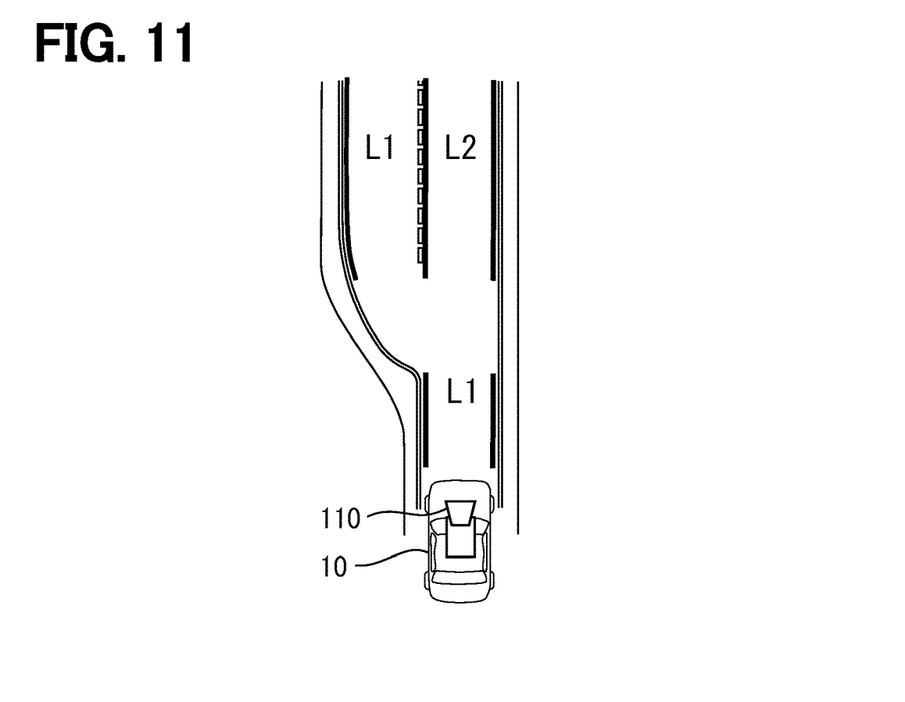
FIG. 11 is a diagram showing a determination condition in FIG. 10.

The following will describe a second embodiment of the present disclosure with reference to FIG. 10 and FIG. 11. A configuration of the recognition of the road section with no line according to the second embodiment is different from that of the first embodiment. Other configurations of second embodiment are similar to those of the first embodiment.

As shown in FIG. 10, after S100, the lane quantity change determiner 151 determines whether a second condition is satisfied in S110B. The second condition is about a recognition of a start position of the road section with no line (the road section in which the quantity of lanes changes) based on the lane quantity (L1 in FIG. 11 or L1 and L2 in FIG. 11) that is obtained by a recognition of the marking lines on the road by the vehicle-mounted camera 110. The second condition is satisfied when a change (increase or decrease) of the lane quantity is determined. For example, when the number of lanes decreases, the change in the number of lanes decreases.

In response to YES determination in S110B, the lane quantity change determiner 151 determines, in S1102, that the present position of the vehicle is the start position of the road section with no line. In response to NO determination in S110B, the lane quantity change determiner 151 determines that the road section with no line does not exist, and ends the process.

In the present embodiment, the existence of the road section with no line can be easily determined. In response to the existence of the road section with no line, the estimation position based on the map data is corrected by lowering the weighting of the estimation position based on map data. Thus, it is possible to suppress a decrease in the estimation accuracy of the vehicle position in the road section where the quantity of lanes increases or decreases.

Third Embodiment

Figure 12:
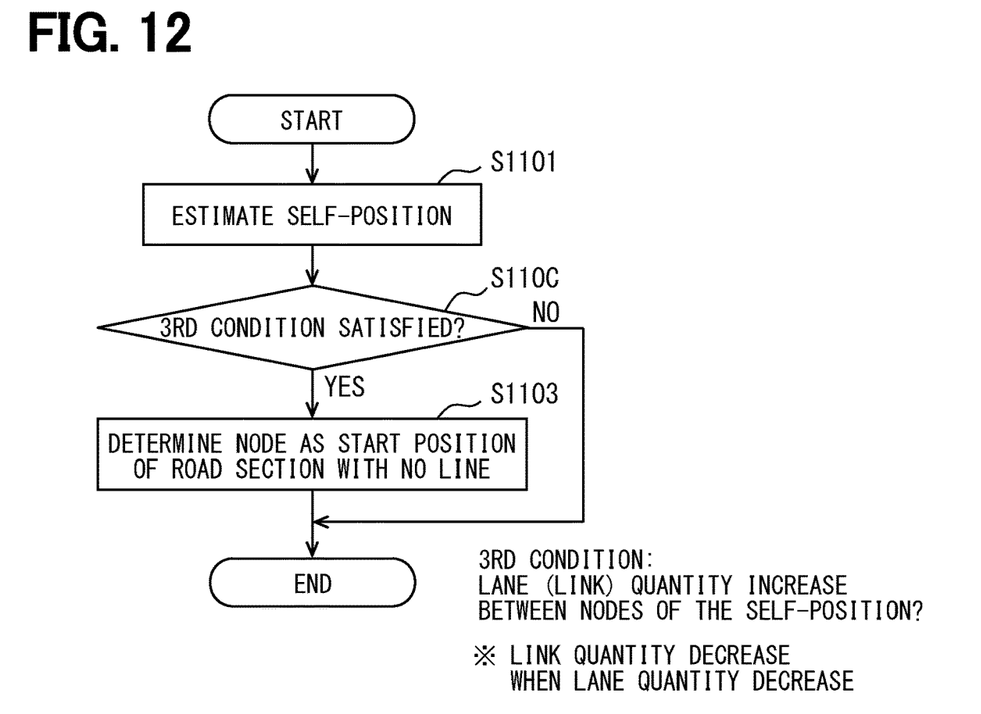
FIG. 12 is a flowchart showing a recognition of a road section with no line according to a third embodiment.
Figure 13:
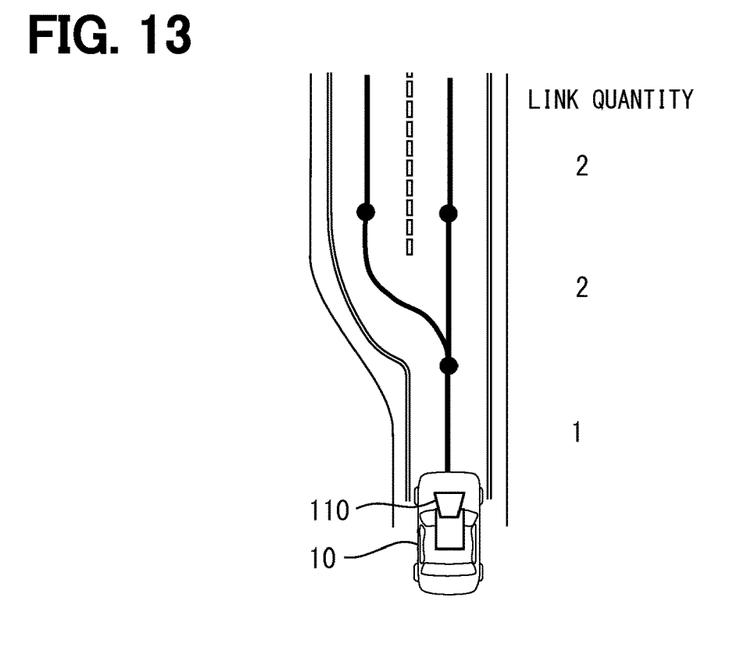
FIG. 13 is a diagram showing a determination condition in FIG. 12.

The following will describe a third embodiment with reference to FIG. 12 and FIG. 13. A configuration of the recognition of the road section with no line according to the third embodiment is different from that of the first embodiment. Other configurations of second embodiment are similar to those of the first embodiment.

As shown in FIG. 12, in S1101, the position estimation unit 150 estimates the self-position, that is, specifies the link 141 where the vehicle 10 is positioned on the map data.

In S110C, the lane quantity change determiner 151 determines whether a third condition is satisfied. The third condition is about a recognition of a start position of the road section with no line (the road section in which the quantity of lanes changes) based on the self-position obtained by the position estimation unit 150 and a quantity of links in the map data (one link or two links shown in FIG. 13). The third condition is satisfied when a quantity change (increase or decrease) of the links 141 between two adjacent nodes 142 is determined. The third condition is satisfied when the quantity of links between two adjacent nodes with respect to the self-position of the vehicle is increased. The third condition is also satisfied when the quantity of links between two adjacent nodes with respect to the self-position of the vehicle is decreased.

In response to YES determination in S110C, the lane quantity change determiner 151 determines, in S1103, that the node 142 is the start position of the road section with no line. In response to NO determination in S110C, the lane quantity change determiner 151 determines that the road section with no line does not exist, and ends the process.

In the present embodiment, the existence of the road section with no line can be easily determined. In response to the existence of the road section with no line, the estimation position based on the map data is corrected by lowering the weighting of the estimation position based on map data. Thus, it is possible to suppress a decrease in the estimation accuracy of the vehicle position in the road section where the quantity of lanes increases or decreases.

Fourth Embodiment

Figure 14:
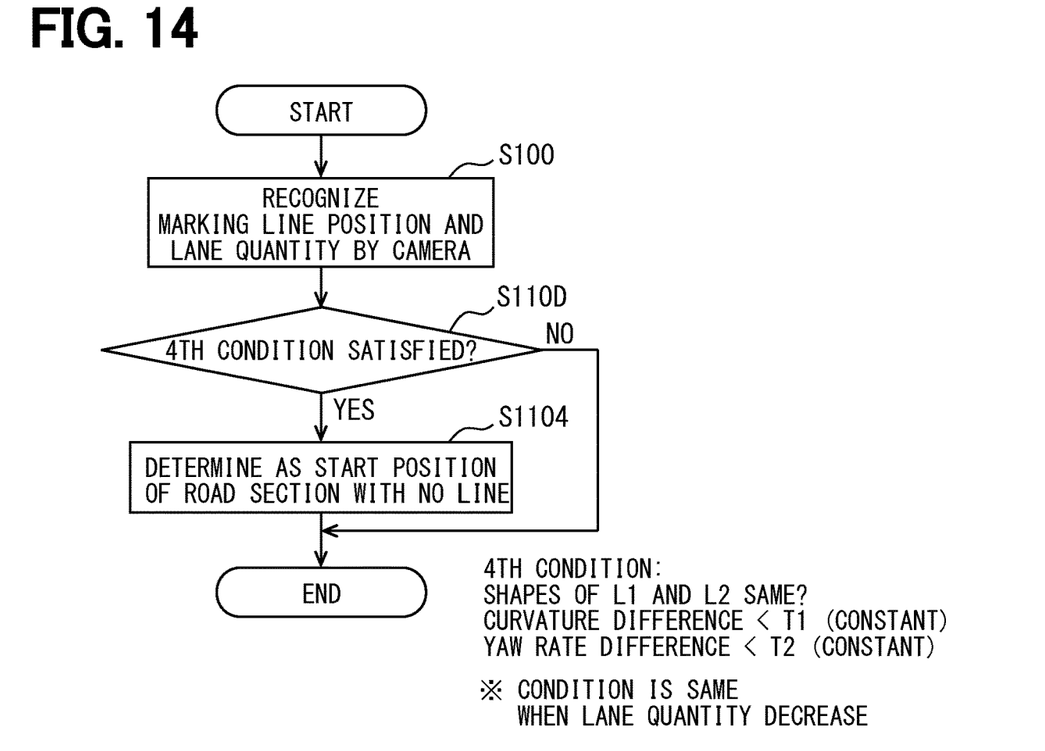
FIG. 14 is a flowchart showing a recognition of a road section with no line according to a fourth embodiment.
Figure 15:
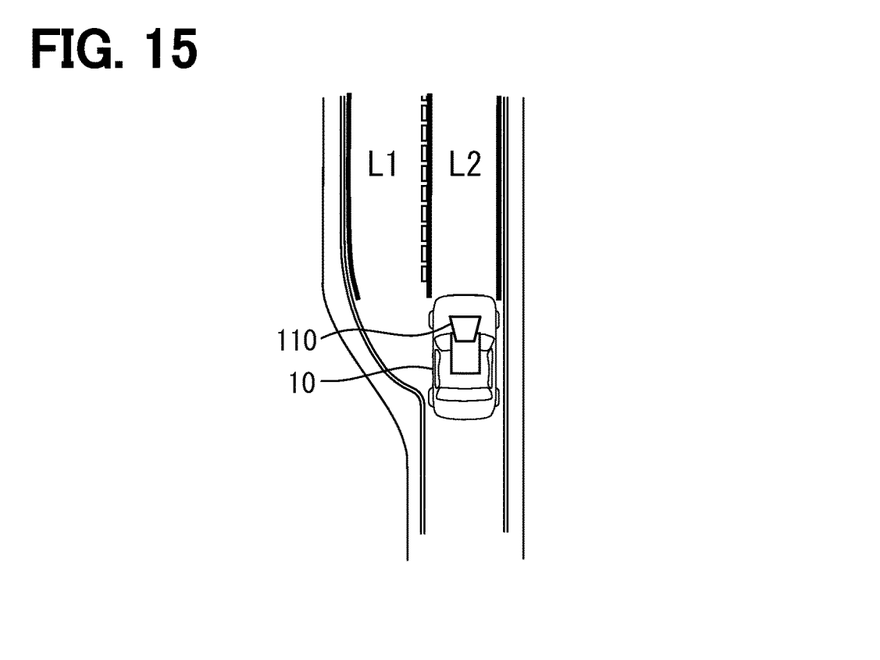
FIG. 15 is a diagram showing a determination condition in FIG. 14.

The following will describe a fourth embodiment with reference to FIG. 14 and FIG. 15. A configuration of the recognition of the road section with no line according to the fourth embodiment is different from that of the first embodiment. Other configurations of second embodiment are similar to those of the first embodiment.

As shown in FIG. 14, after S100, the lane quantity change determiner 151 determines whether a fourth condition is satisfied in S110D. The fourth condition is about a recognition of a start position of the road section in which the quantity of lanes changes based on the own lane on which the vehicle is travelling and a difference of the road shape of the own lane from a road shape of another lane. The own lane on which the vehicle is travelling and the difference between the road shape of the own lane from the road shape of another lane are obtained by the marking line recognition of the vehicle-mounted camera 110. The fourth condition is satisfied when a shape of the road L1 is identical to a shape of the road L2, or when a difference between the curvatures of two roads<a predetermined conformance constant T1, or a difference between yaw angles<a predetermined conformance constant T2.

In response to YES determination in S110D, the lane quantity change determiner 151 determines that the present position of the vehicle is the start position of the road section with no line in S1104. In response to NO determination in S110D, the lane quantity change determiner 151 determines that the road section with no line does not exist, and ends the process.

In the present embodiment, the existence of the road section with no line can be easily determined. In response to the existence of the road section with no line, the estimation position based on the map data is corrected by lowering the weighting of the estimation position based on map data. Thus, it is possible to suppress a decrease in the estimation accuracy of the vehicle position in the road section where the quantity of lanes increases or decreases.

Fifth Embodiment

Figure 16:
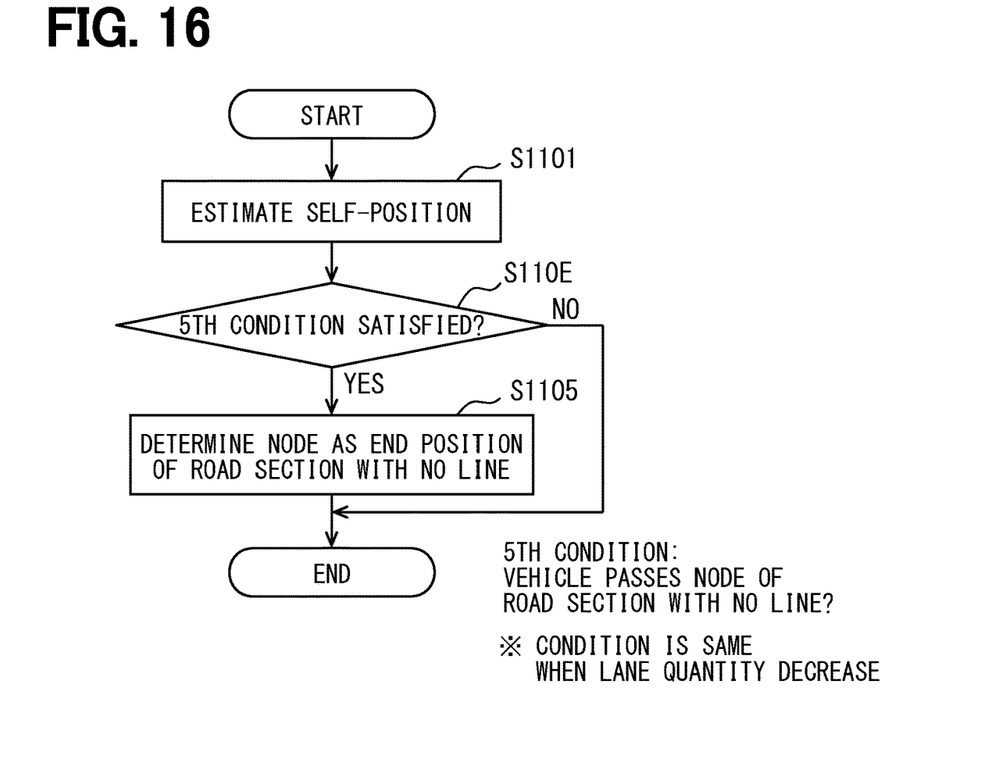
FIG. 16 is a flowchart showing a recognition of a road section with no line according to a fifth embodiment.
Figure 17:
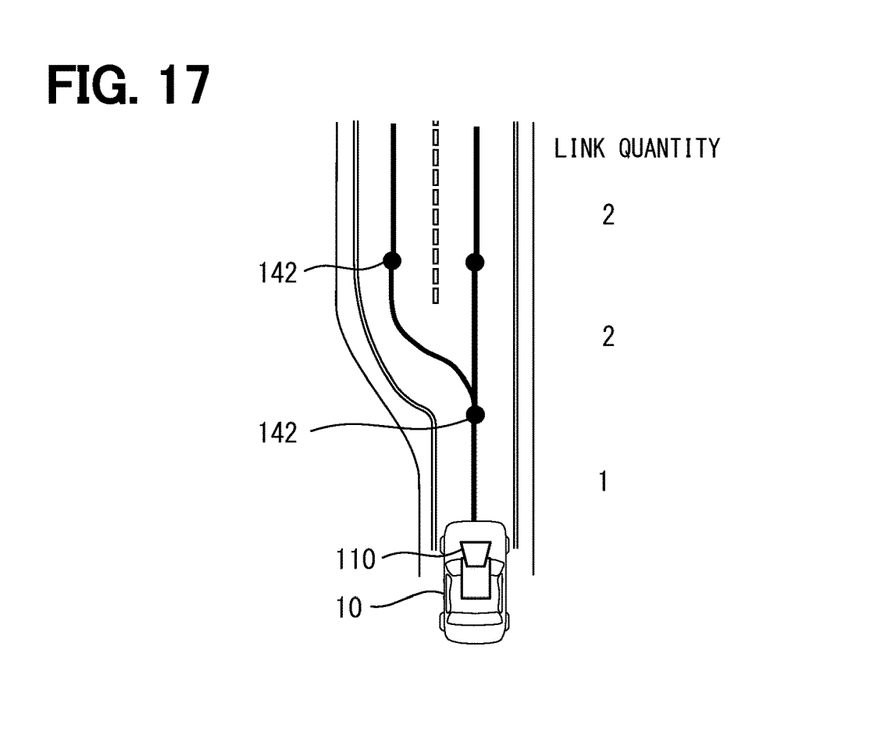
FIG. 17 is a diagram showing a determination condition in FIG. 16.

The following will describe a fifth embodiment with reference to FIG. 16 and FIG. 17. A configuration of the recognition of the road section with no line according to the fifth embodiment is different from that of the first embodiment. Other configurations of second embodiment are similar to those of the first embodiment.

As shown in FIG. 16, in S1101, the position estimation unit 150 estimates the self-position, that is, specifies the link 141 where the vehicle 10 is positioned on the map data.

In S110E, the lane quantity change determiner 151 determines whether a fifth condition is satisfied. The fifth condition is satisfied in response to a determination of the vehicle has passed the end node 142 of the road section with no line.

In response to YES determination in S110E, the lane quantity change determiner 151 determines, in S1105, that the node 142 is the end position of the road section with no line. In response to NO determination in S110E, the lane quantity change determiner 151 determines that the road section with no line does not exist, and ends the process.

In the present embodiment, the existence of the road section with no line can be easily determined. In response to the existence of the road section with no line, the estimation position based on the map data is corrected by lowering the weighting of the estimation position based on map data. Thus, it is possible to suppress a decrease in the estimation accuracy of the vehicle position in the road section where the quantity of lanes increases or decreases.

The control and the method therefor which have been described in the present disclosure may be implemented by a special purpose computer which includes a processor programmed to execute one or more functions executed by computer programs. Alternatively, the controller and the method described in the present disclosure may be implemented by a special purpose computer configured as a processor with a special purpose hardware logic circuits. Alternatively, the controller and the method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

It is noted that a flowchart or the process of the flowchart in the present disclosure includes multiple steps (also referred to as sections), each of which is represented, for example, as S100. Further, each step can be divided into several sub-steps while several steps can be combined into a single step.

In the above description, the embodiments, the configurations, the aspects of the self-position estimation device according to the present disclosure are exemplified. The present disclosure is not limited to the above-described embodiments, each configuration and each aspect related to the present disclosure. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A self-position estimation device equipped to a vehicle and estimating a position of the vehicle, the self-position estimation device comprising:
   a vehicle-mounted camera capturing an image of a periphery of the vehicle;
   a vehicle state quantity sensor detecting a state quantity of the vehicle;
   a satellite positioning acquisition unit acquiring position information indicating a position of the vehicle from a satellite system;
   a map data storage storing map data that defines a map in which a road is expressed by a link and a node;
   a position estimation unit estimating a self-position of the vehicle on the map, as an estimation position, based on the image captured by the vehicle-mounted camera, the state quantity, the position information, and the map data, respectively;
   a lane quantity change determiner recognizing a road section in which a lane quantity increases or decreases based on the image captured by the vehicle-mounted camera; and
   a position corrector setting a weighting of the estimation position of the vehicle estimated by the position estimation unit based on the map data to be relatively smaller in response to a recognition of the road section in which the lane quantity increases or decreases compared with a case where the road section in which the lane quantity increases or decreases is not recognized.

2. The self-position estimation device according to claim 1, wherein
   the position corrector corrects the estimation position of the vehicle estimated based on the map data in response to the recognition of the road section in which the lane quantity increases or decreases.

3. The self-position estimation device according to claim 2, wherein
   the lane quantity change determiner recognizes a start position of the road section in which the lane quantity increases or decreases with reference to a change in a road width determined based on a recognition of marking lines on the road by the vehicle-mounted camera.

4. The self-position estimation device according to claim 2, wherein
   the lane quantity change determiner recognizes a start position of the road section in which the lane quantity increases or decreases with reference to the lane quantity determined based on a recognition of marking lines on the road by the vehicle-mounted camera.

5. The self position estimation device according to claim 2, wherein
   the lane quantity change determiner recognizes a start position of the road section in which the lane quantity increases or decreases with reference to the self-position of the vehicle estimated by the position estimation unit and a link quantity of the map data.

6. The self position estimation device according to claim 2, wherein
   the lane quantity change determiner recognizes a start position of the road section in which the lane quantity increases or decreases with reference to a shape difference between an own lane along which the vehicle travels and another lane obtained by a recognition of marking lines on the road by the vehicle-mounted camera.

7. The self-position estimation device according to claim 1, wherein,
   in response to the recognition of the road section in which the lane quantity increases or decreases, the position corrector corrects the self-position of the vehicle on the map with reference to the estimation position estimated based on the map data with the weighting set to be relatively smaller, the image captured by the vehicle-mounted camera, the state quantity, and the position information.

8. A self-position estimation device equipped to a vehicle, the self-position estimation device comprising:
   a vehicle-mounted camera capturing an image of a periphery of the vehicle;
   a vehicle state quantity sensor detecting a state quantity of the vehicle;
   a satellite positioning acquisition unit acquiring latitude and longitude of a position of the vehicle from a satellite system;
   a map data storage storing map data that defines a map in which a road is expressed by a link and a node; and
   a position estimation unit estimating a self-position of the vehicle on the map, as an estimation position, based on the image captured by the vehicle-mounted camera, the state quantity, the latitude and longitude, and the map data, respectively;
   wherein the position estimation unit includes:
      a lane quantity change determiner recognizing a road section in which a lane quantity increases or decreases based on a sensing of the vehicle-mounted camera; and
      a position corrector correcting the estimation position of the vehicle estimated by the position estimation unit based on the map data by setting a weighting of the estimation position of the vehicle estimated based on the map data smaller in response to a recognition of the road section in which the lane quantity increases or decreases compared with a case where the road section in which the lane quantity increases or decreases is not recognized.

9. The self-position estimation device according to claim 8, wherein
the lane quantity change determiner recognizes a start position of the road section in which the lane quantity increases or decreases with reference to a change in a road width determined based on a recognition of marking lines on the road by the vehicle-mounted camera.

10. The self-position estimation device according to claim 8, wherein
the lane quantity change determiner recognizes a start position of the road section in which the lane quantity increases or decreases with reference to the lane quantity determined based on a recognition of marking lines on the road by the vehicle-mounted camera.

11. The self-position estimation device according to claim 8, wherein
the lane quantity change determiner recognizes a start position of the road section in which the lane quantity increases or decreases with reference to the self-position of the vehicle estimated by the position estimation unit and a link quantity of the map data.

12. The self-position estimation device according to claim 8, wherein
the lane quantity change determiner recognizes a start position of the road section in which the lane quantity increases or decreases with reference to a shape difference between an own lane along which the vehicle travels and another lane obtained by a recognition of marking lines on the road by the vehicle-mounted camera.

13. A self-position estimation device equipped to a vehicle and estimating a position of the vehicle, the self-position estimation device comprising:
a vehicle-mounted camera capturing an image of a periphery of the vehicle;
a vehicle state quantity sensor detecting a state quantity of the vehicle, the state quantity of the vehicle including a vehicle speed;
a receiver receiving position information indicating a position of the vehicle from a satellite system;
a map data storage storing map data that defines a map in which a road is expressed by a link and a node; and
a processor, by executing a program stored in a non-transitory computer readable medium, configured to:
estimate a self-position of the vehicle on the map, as an estimation position, based on the image captured by the vehicle-mounted camera, the state quantity of the vehicle, the position information of the vehicle from the satellite system, and the map data, respectively;
recognize a road section in which a lane quantity increases or decreases based on the image captured by the vehicle-mounted camera; and
correct the estimation position of the vehicle estimated based on the map data, in response to a recognition of the road section in which the lane quantity increases or decreases, by setting a weighting of the estimation position of the vehicle estimated based on the map data smaller than a case where the road section in which the lane quantity increases or decreases is not recognized.

14. The self-position estimation device according to claim 13, wherein
the processor recognizes a start position of the road section in which the lane quantity increases or decreases with reference to a change in a road width determined based on a recognition of marking lines on the road by the vehicle-mounted camera.

15. The self-position estimation device according to claim 13, wherein
the processor recognizes a start position of the road section in which the lane quantity increases or decreases with reference to the lane quantity determined based on a recognition of marking lines on the road by the vehicle-mounted camera.

16. The self-position estimation device according to claim 13, wherein
the processor recognizes a start position of the road section in which the lane quantity increases or decreases with reference to the estimated self-position of the vehicle and a link quantity of the map data.

17. The self-position estimation device according to claim 13, wherein
the processor recognizes a start position of the road section in which the lane quantity increases or decreases with reference to a shape difference between an own lane along which the vehicle travels and another lane obtained by a recognition of marking lines on the road by the vehicle-mounted camera.

* * * * *